United States Patent

[11] 3,575,361

[72] Inventor Cornelius Wildhagen
5112-1/2 Tujunga Ave., North Hollywood, Calif. 91601

[21] Appl. No. 769,073
[22] Filed Oct. 21, 1968
[45] Patented Apr. 20, 1971

[54] TAPE CARTRIDGE
3 Claims, 7 Drawing Figs.

[52] U.S. Cl. ........ 242/192, 242/194

[51] Int. Cl. ........ G11b, 15/32 G11b 23/08

[50] Field of Search ........ 242/192, 194, 193, 197, 198, 199, 200, 71.2; 352/72, 78, 156

[56] References Cited

UNITED STATES PATENTS

| | | | |
|---|---|---|---|
| 2,733,069 | 1/1956 | Frost et al. | 242/192 |
| 3,370,804 | 2/1968 | Peyton | 242/192 |
| 3,468,497 | 9/1969 | Kelley | 242/192 |

*Primary Examiner*—George F. Mautz

ABSTRACT: A tape cartridge or the like including a rotatably mounted drive roller for transmitting motion to two stacked tape-supporting reels rotatably mounted on movable axes within said cartridge. The tape-supporting reels are biased into engagement with the drive roller to reversibly transfer a length of tape from one reel to the other. A tape-loop roller rotatably mounted for engagement with the drive roller displaces the tape vertically for alignment with each of the tape-supporting reels.

INVENTOR.
CORNELIUS WILDHAGEN,
By His ATTORNEYS
HARRIS, KIECH, RUSSELL & KERN.

TAPE CARTRIDGE

This invention relates to tape cartridges and more particularly to cartridges which may be employed with tape recorders or as bit storage components for digital computers. Although principally intended for such usages, the invention may be employed with the transfer of a length of any type of material such as tape or film from one supporting reel to another and all such uses are intended to be within the scope of the invention.

Small tape cartridges, or cassettes for tape recorders and the like, are becoming quite popular and are in widespread use today. The tape recorder cartridges may be endless or continuous-loop systems or may be two-reel systems where the reels are positioned adjacent one another or are stacked, axially aligned, one on top of the other. Typically, drive is transmitted to the tape from a capstan and the drive on the tape rotates the single or supply reel while the takeup reel may itself be driven through its axial connection to the cartridge. The tape is rewound tightly on the takeup reel by applying some form of tension to the tape from the difference between the drive from the takeup reel and the drive from the capstan. Drive applied to the tape from the capstan and the tension applied from the takeup reel create problems both as to wear on the tape and slippage, causing sound recording and transmission difficulties. And, further, the more drive systems utilized, the more intricate becomes the respective timing for these systems. These problems seemingly would be typical with any type of tape cartridge for any purpose.

I have invented a novel and useful cartridge which may be used with a tape recorder or the like, or for various other purposes, which substantially eliminates the aforementioned problems. My device is easily and inexpensively assembled and can be made up into a compact ready-to-use unit. My device transmits drive from a capstan to a drive roller and thence directly to the tape supply and takeup reels producing a self-winding system and eliminating any tension or pull on the tape and the need for various synchronized drive speeds.

More particularly, my device comprises a tape cartridge or the like having a housing with a drive roller rotatably mounted thereon for transmitting motion to a pair of stacked, tape-supporting reels rotatably mounted on movable axes within the housing. The tape-supporting reels are biased into engagement with the drive roller to reversibly transfer a length of tape from one reel to the other. The tape is unwound from one reel as it engages the drive roller and is rewound on the other reel as that reel engages the drive roller. Because uniform motion is transmitted to both tape-supporting reels, no slippage or tension on the tape is produced or is necessary. A tape-loop roller is rotatably mounted to engage the drive roller and functions to displace the length of tape vertically to align the tape with each of the tape-supporting reels.

Accordingly, it is an object of my invention to provide a tape cartridge which is inexpensively manufactured and easily assembled to provide a compact ready-to-use device.

Another object of my invention is to provide a self-winding tape cartridge system wherein motion is transmitted from a drive roller to tape-supporting reels. A further object is to provide such a cartridge where a length of tape is reversibly transferred, tension-free, from one tape-supporting reel to another.

Another object of my invention is to provide such a tape cartridge where two tape-supporting reels are stacked one upon the other and are rotatably mounted on movable axes within the cartridge and are biased into engagement with the drive roller for transmitting motion therebetween.

The invention, both as to its organization and method of operation, together with further objects and advantages thereof, may best be understood by reference to the following description taken in connection with the accompanying drawing.

Figures 1, 2, 6:
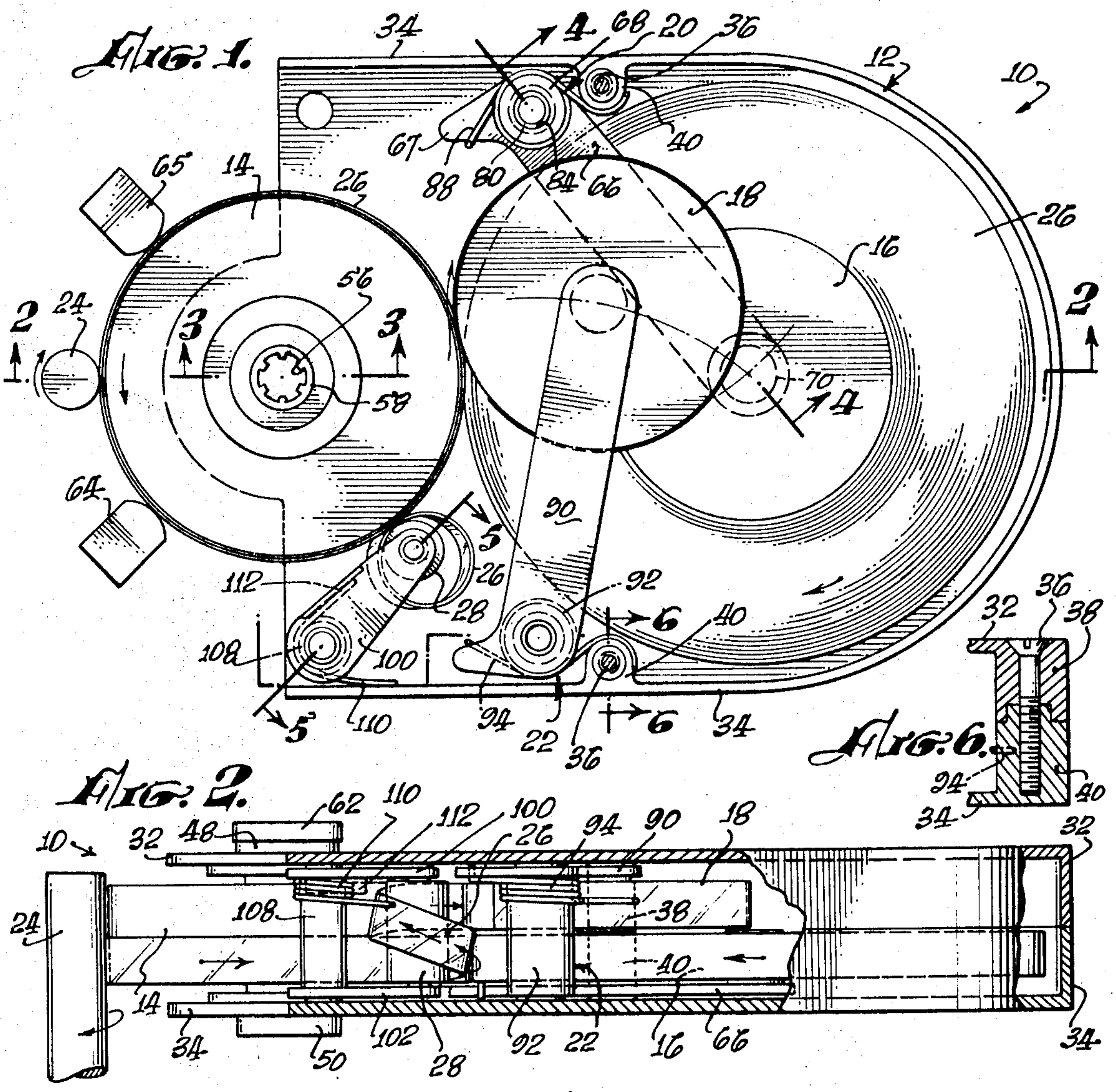
FIG. 1 is a top plan view of my cartridge with the top half of the housing removed.
FIG. 2 is a partly elevational, partly sectional view taken along the line 2–2 in FIG. 1 with the housing assembled.
Figure 7:
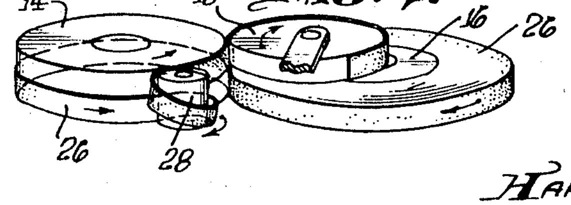

FIGS. 3, 4, 5, and 6 are fragmentary sectional views taken along the lines 3–3, 4–4, 5–5, and 6–6, respectively, in FIG. 1 with the housing assembled; and FIG. 7 is a reduced scale isometric view of the rollers and reels of my cartridge.

Referring to the drawing, the numeral 10 designates the tape cartridge of my invention. The cartridge 10 includes a housing 12 with a drive roller 14 rotatably mounted thereon. Two vertically stacked, tape-supporting reels 16 and 18 are rotatably mounted on movable axes within the housing 12 and are biased by biasing means 20 and 22, respectively, into engagement with the drive roller 14. The drive roller 14 is engaged and driven by a rotatable capstan 24, the drive roller in turn rotating the tape-supporting reels 16 and 18 to wind a length of tape 26 from one of said reels to the other. The tape 26 may, for example, be four-track or eight-track magnetic tape used with common tape recorder cartridges. The tape 26 could also be wide 17-track tape used with digital computers, or could be a type of film strip. A tape-loop roller 28, rotatably mounted in the housing 12 and biased into engagement with the drive roller 14, displaces the tape 26 vertically (FIG. 2 and 7) to align the tape 26 with each of the vertically stacked reels 16 and 18.

More particularly, and in the illustrated form of my invention, the housing 12 includes top and bottom shell members 32 and 34, which are substantially identical and are adapted to be assembled one upon the other as shown in FIG. 2. The shell members 32 and 34 are attached together at each side thereof by screws 36 which are inserted within mating bosses 38 and 40 (FIG. 6) of the shell members 32 and 34, respectively. The shell members 32 and 34 may be formed or pressed from any suitable material, such as a plastic.

Figures 3, 4, 5:
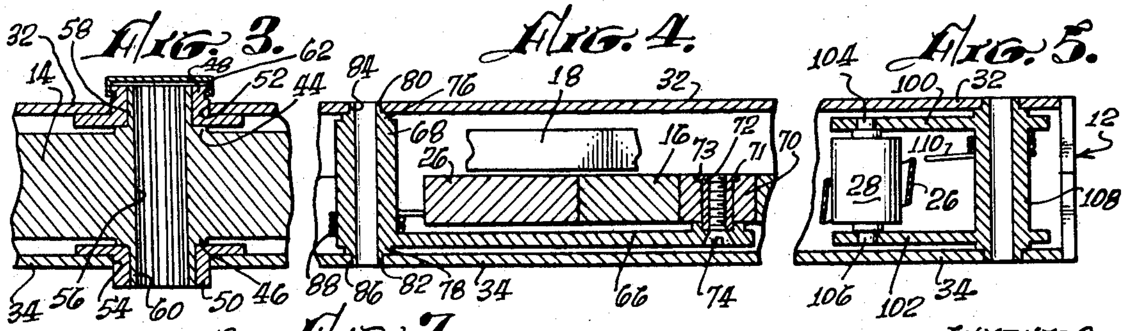

The drive roller 14 is rotatably mounted, preferably on a fixed axis, on the housing 12 and is adapted to transfer the driving motion from the capstan 24 to the reels 16 and 18 and the tape-loop roller 28. The drive roller 14 can be formed from any suitable material, such as a plastic, and preferably is covered about its circumference with a frictional material such as natural or artificial rubber. As shown in FIGS. 1 and 3, the drive roller 14 includes annular top and bottom shoulder members 44 and 46 which abut against bearings 48 and 50, which are disposed in openings 52 and 54 in the top shell 32 and bottom shell 34, respectively. The drive roller 14 has a central bore 56 and includes top and bottom annular neck portions 58 and 60 which are journaled in the bearing members 48 and 50 respectively. The drive roller 14 is thereby rotatably mounted to the housing 12 of the cartridge. An indexing cap member 62 is secured about the top of the upper bearing member 48 to act as a guide for the cartridge 10 when it is loaded into a suitable cradle support assembly (not shown) to prevent its being loaded upside down, which would misalign the tape with magnetic heads 64 and 65 (FIG. 1) of an audio unit (not shown) where, for example, the cartridge is used with a tape recorder. The central bore 56 preferably is splined to receive a shaft of a secondary drive unit (not shown) for driving the drive roller 14 in a fast forward or rewind mode of the cartridge when the capstan 24 is not utilized.

The tape-supporting reels 16 and 18 are rotatably mounted on movable axes within the housing 12 and are biased by the biasing means 20 and 22, respectively, into driven engagement with the drive roller 14, to transfer the tape 26 from one reel to the other. As shown in FIGS. 1 and 4, the reel 16 is rotatably supported on an arm 66 extending from a hollow pivot member 68 pivotally attached to the housing 12. The tape-supporting reel 16 may be formed from any suitable material, such as a plastic, and includes a hollow central mounting portion 70 to receive a sleeve member 72 and a screw 74 to rotatably mount the tape-supporting reel 16 on the arm 66. The sleeve member 72 may include an annular shoulder 73 which fits within a corresponding annular groove 71 in the central mounting portion 70 to permit a running fit between the sleeve 72 and mounting portion 70 which is itself moulded or press-fit into the reel 16. The arm 66 preferably may pivot within the housing 12 to vary the rotational axis of the reel 16. The pivot member 68 of the arm 66 includes annular shoulders 76 and 78 which rotatably seat on the top shell 32 and bottom shell 34, respectively. Tubular sleeves 80 and 82 on the pivot member 68 are journaled within openings 84 and 86 in the shell members 32 and 34, respectively, to rotatably mount the pivot member 68 and the pivot arm 66 within the housing 12 of the cartridge 10.

The tape 26 is wound about the circumference of the tape-supporting reel 16 and the biasing means 20 biases the reel 16 with its tape 26 against the lower portion of the drive roller 14 to be driven thereby. The biasing means 20 includes a rattrap spring 88, between a lip 67 of the arm 66 and the side of the boss 40 of the housing 12, for continually biasing the reel 16 toward the drive roller 14. As the tape 26 is unwound from or rewound on the reel 16, the pivot arm 66 swings toward or away from the drive roller 14 and the rotational axis of the reel 16 swings accordingly.

The tape-supporting reel 18 is similarly rotatably mounted on a movable axis in the housing 12 by a pivot arm 90 which extends above the reel 18 from a hollow pivot member 92 pivotally mounted to the housing 12 and similar to the pivot member 68 for mounting the reel 16. A rattrap spring 94 similar to the spring 88, biases the reel 18 into engagement with the upper portion of the drive roller 14 in a manner similar to the biasing of the reel 16; however, as seen in FIG. 1, the pivotal axes of the pivot arms 66 and 90 are on opposite sides of the housing 12. The reels 16 and 18, therefore, are stacked one above the other and are rotatably mounted on movable axes to engage the drive roller 14 to be driven by it. The movable axes of the reels 16 and 18 and the fixed axis of the drive rollers 14 are parallel, as indicated.

As shown in FIGS. 1 and 5, the loop roller 28 is mounted for rotational engagement with the drive roller 14. The loop roller 28 is rotatably mounted on pivot arms 100 and 102 by pivot pins 104 and 106, respectively. The pivot arms 100 and 102 are connected to a hollow pivot member 108 which is pivotally connected to the top and bottom shell members 32 and 34, respectively, in a fashion similar to the connection of the pivot member 68 for the tape-supporting reel 16. A rattrap spring 110, between a protrusion 112 of the upper arm 100 and the side of the housing 12, urges the tape-loop roller 28 into engagement with the drive roller 14. The movable rotational axis of the loop roller 28 is parallel to the axes of the reels 16 and 18 and support roller 14.

As shown by the drawing, and particularly FIG. 7, the tape 26 is transferred from one reel 16 or 18 to the other and this process is reversible so that the tape can be selectively unwound or rewound from one reel to the other. For example, as shown, if the tape is to be transferred from reel 16 to reel 18, the capstan 24 is rotated clockwise, rotating the drive roller 14 counterclockwise and, in turn, the reels 16 and 18 clockwise. The tape 26 is drawn off the reel 16 to partially encircle the support roller 14 and then passes between the drive roller 14 and the loop roller 28. The tape 26 is loosely looped about the roller 28 and is displaced vertically (FIGS. 2 and 7), then again passes between the drive roller and the loop roller, but in the plane of the reel 18, passing around part of the circumference of the drive roller, between the drive roller and the reel 18, and is wound on the reel 18. The reel 18, which here serves as the takeup reel, is therefore turned by the drive roller 14 and the tape is received on the takeup reel without any slippage or without any tension being applied to the tape itself, which is an important feature of the invention. The tape moves with a constant velocity from one reel to the other. As the tape 26 passes around the drive roller 14, the magnetic head 64 and/or 65 may be moved into engagement with the tape for the audio operation of the cartridge 10 where for example, the cartridge is used with a tape recorder. The entire process is reversible in that the tape may be transferred from reel 18 to reel 16 and by relative vertical movement between the heads 64 and/or 65 and the tape a different track on the tape may be utilized.

For loading or removing tape from the cartridge 10, a fixture having a pattern of dowel pins (not shown) may be used. The alignment pattern and the diameters of the pins will be so arranged that when the cartridge is pressed down on them the pins will slide snugly into the hollow pivot members 68, 92, and 108 along the teeth of the spline in the bore 56 of drive roller 14. Where the assembly screws 36 are then removed, shell 32 can be lifted from shell 34 and the tape can be easily loaded and assembled, in proper alignment with and about the drive roller and reels, or unloaded from the cartridge. When shell members 32 and 34 are reconnected, the fixture may be withdrawn and the cartridge is again ready for use.

Although I have described in some detail an exemplary embodiment of my invention, changes, modifications, and substitutions may be made therein without departing from the spirit of the invention. I therefore intend that my invention be limited in scope only by terms of the following claims.

I claim:

1. In a tape cartridge, the combination of:
- a housing;
- a drive roller rotatably mounted on a fixed axis in said housing;
- first and second drive reels mounted in vertically spaced, parallel planes, each of said driven reels being rotatably mounted on a movable axis in said housing, said movable axes being parallel to said fixed axis;
- biasing means for biasing said driven reels into peripheral engagement with said drive roller to be rotatably driven thereby;
- a length of tape attached to said first reel and extending therefrom between said first reel and said drive roller, partially around and in contact with said drive roller, then between said drive roller and said second reel, and then attached to said second reel, whereby upon rotation of said drive roller in one direction said tape will be unwound from said first reel and wound on said second reel;
- a loop roller rotatably mounted in said housing and having an axis parallel to said other axes; and
- means for biasing said loop roller into peripheral engagement with said drive roller to be rotatably driven thereby, said length of tape passing between said drive roller and said loop roller, then being looped downwardly in a free loop around said loop roller, and again passing between said loop roller and said drive roller, intermediate said reels, to align said tape with the plane of each of said reels.

2. A tape cartridge as defined in claim 1 wherein the rotation of said drive roller is reversible to permit said tape to be unwound from either of said reels and wound on the other.

3. In a tape cartridge, the combination of:
- a housing;
- a drive roller rotatably mounted on a fixed axis in said housing;
- first and second driven reels in said housing, each having an axis parallel to said fixed axis, said reels being disposed in parallel but vertically spaced planes;
- biasing means for biasing said driven reels into peripheral engagement with said drive roller to be rotatably driven thereby;
- a free loop roller rotatably mounted in said housing and having an axis parallel to said other axes;
- means for biasing said free loop roller into peripheral engagement with said drive roller to be rotatably driven thereby; and
- a tape attached to said first reel and extending therefrom between said first reel and said drive roller, partially around and in contact with said drive roller in the plane of said first reel, then between said drive roller and said loop roller, then in a free loop around said loop roller and downwardly into the plane of said second reel, then between said loop roller and said drive roller, then around a part of the circumference of said drive roller, then between said drive roller and said second reel, and then attached to said second reel, whereby upon rotation of said drive roller in one direction said tape will be unwound from said first reel and wound on said second reel and upon rotation of said drive roller in a reverse direction said tape will be unwound from said second reel and wound on said first reel.

UNITED STATES PATENT OFFICE

CERTIFICATE OF CORRECTION

Patent No. 3575361 Dated April 20, 1971

Inventor(s) Cornelius Wildhagen

It is certified that error appears in the above-identified patent and that said Letters Patent are hereby corrected as shown below:

Column 2, line 21, "FIG." should be --FIGS.-- (page 5, line 17);

Column 3, line 33, "rollers" should be --roller-- (page 8, line 24);

Column 4, line 6, after "108" insert --and-- (page 10, line 22), and
line 18, after "by" insert --the-- (page 11, line 5)

line 25 (Claim 1), "drive should be --driven-- (Claim 1, line 6, amendment dated July 7, 1970)
line 37 (Claim 1), after "direction" insert --,-- (Claim 1, line 18, amendment dated July 7, 1970)

Signed and sealed this 14th day of September 1971.

(SEAL)
Attest:

EDWARD M.FLETCHER,JR.
Attesting Officer

ROBERT GOTTSCHALK
Acting Commissioner of Pat